Figure 1:
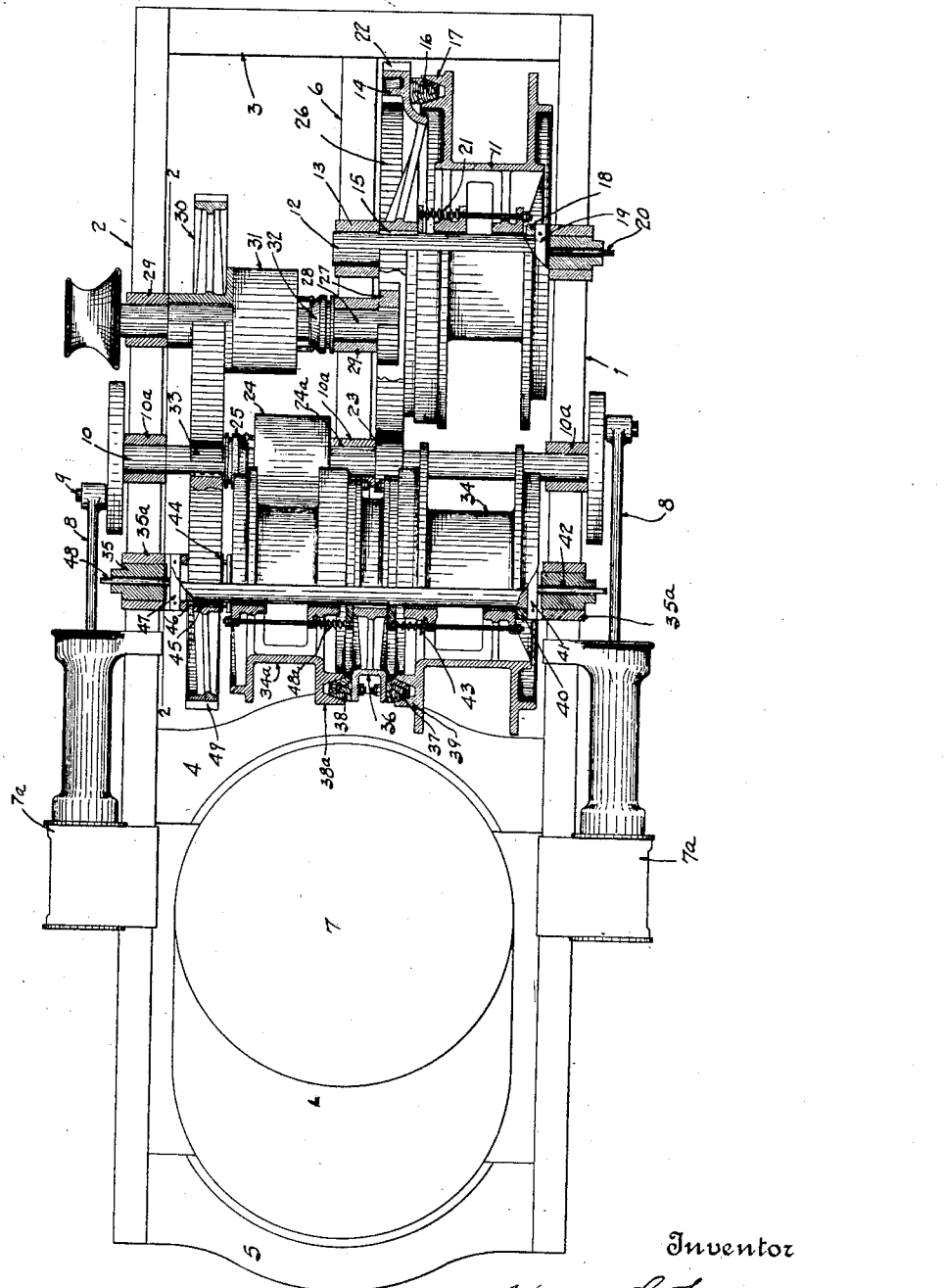

H. L. TURNEY.
LOGGING ENGINE.
APPLICATION FILED JUNE 27, 1919.

1,331,295.

Patented Feb. 17, 1920.
2 SHEETS—SHEET 1.

Inventor
Harry L. Turney
By
Attorney

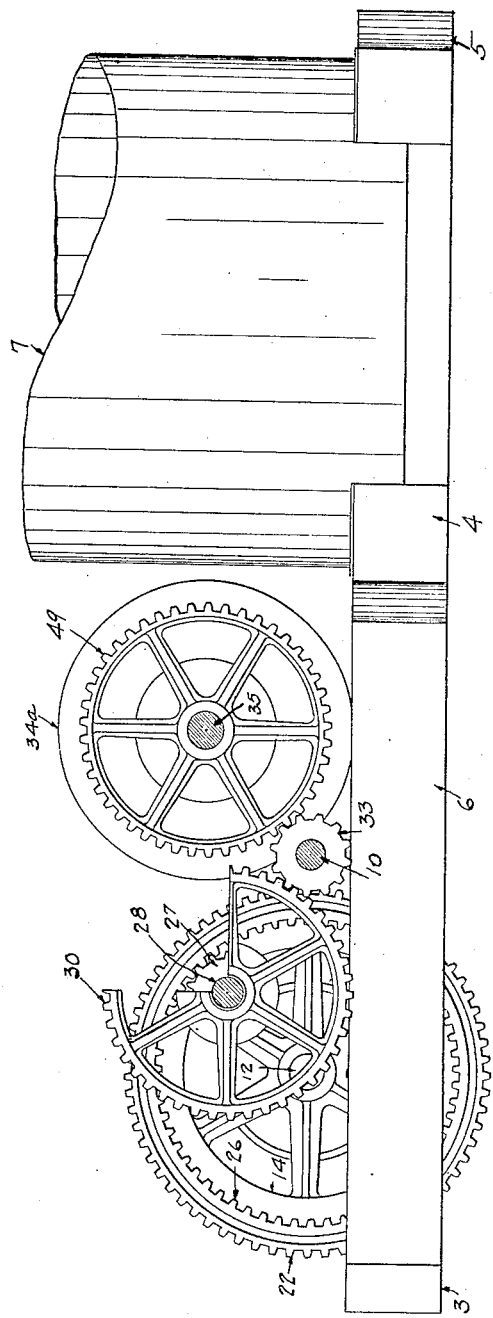

UNITED STATES PATENT OFFICE.

HARRY L. TURNEY, OF PORTLAND, OREGON.

LOGGING-ENGINE.

1,331,295.   Specification of Letters Patent.   Patented Feb. 17, 1920.

Application filed June 27, 1919. Serial No. 307,058.

*To all whom it may concern:*

Be it known that I, HARRY L. TURNEY, a citizen of the United States, residing at Portland, in the county of Multnomah and State of Oregon, have invented new and useful Improvements in Logging-Engines, of which the following is a specification.

In logging engines it is desirable to have the main drum provided with means for varying its speed so that it may be capable of handling very heavy loads and at the same time have as great speed as is practical where the loads are lighter. It is also desirable to associate such a drum with other drums for handling the trip line and other lines and as to these lines it is preferable to have a uniform speed usually as high a speed as is practical. In the present invention these features are embodied in a logging engine in a simple and effective manner.

The invention is illustrated in the accompanying drawings as follows:—

Figure 1 shows a plan view of the engine.

Fig. 2 a section on the line 2—2 in Fig. 1.

The frame is made up of the side beams 1 and 2, the end beam 3, the cross beams 4 and 5 and an intermediate longitudinal beam 6.

The usual boiler 7 is mounted in the frame with engines 7ª at each side of the frame. Connecting rods 8 of the engines connect with the cranks 9. The cranks 9 are mounted on the drive shaft 10, the drive shaft being carried in bearings 10ª on the beams 1, 2 and 6.

A main drum 11 is journaled on a shaft 12. The shaft 12 is carried in bearings 13 carried by the beams 1 and 6. A gear wheel 14 is mounted on the shaft and locked against rotation thereon by a key 15. The gear wheel 14 is provided with a friction ring 16 which is adapted to engage a friction wheel 17 on one flange of the main drum in the usual manner. The drum is moved on the shaft forcing it into engagement with the friction ring 16 by the usual thrust mechanism. As shown it comprises a thrust collar 18, thrust key 19 extending through the shaft 12 and thrust pin 20 extending from the thrust key through the bearing 13 to a point outside the bearing. While I have simply shown a thrust pin it will be understood that the usual mechanism for actuating the pin may be employed. The main drum is released through the action of a spring 21.

The gear 14 has an external tooth surface 22 forming an external gear and this meshes with a gear 23 mounted on a shaft sleeve 24ª carried by the drive shaft and extending through a central bearing 10ª. The sleeve is locked with one element of a clutch 24, the other element of the clutch 24 being locked with the drive shaft, the clutch being actuated by the usual sliding conical collar 25. Any desirable clutch mechanism may be used and that shown is simply the outline of a clutch. When the clutch is locked the gear 23 rotates with the shaft 10 and drives the external gear 22 forming a direct train of gearing between the drive shaft and the main drum.

An internal set of gear teeth 26 are arranged on the gear wheel 14 forming an internal gear. This meshes with an intermediate drive gear 27 which is fixed on an intermediate shaft 28. The intermediate shaft is journaled in bearings 29 on the beams 2 and 6. A driven intermediate gear 30 is journaled on the shaft 28 and a clutch 31 is provided for locking the gear 30 with the shaft 28, the operating element 32 of the clutch being of a common form. The driven intermediate gear 30 meshes with an indirect drive gear 33 on the drive shaft 10.

It will be readily seen that the gear ratio of the indirect train of gearing starting with the gear 33 and extending through the gears 30, 27 and 26 will drive the drum at a very much reduced speed over the direct gearing through the gears 23 and 22. Either train of gears may be used by the operation of the clutches 24 and 31. It will be noted that by utilizing the internal gear that only one intermediate shaft is required, it being desirable that the main drum rotate in the same direction with both trains of gears.

A trip line drum 34 is mounted on an auxiliary shaft 35 and is in alinement generally with the main drum so that the trip lines may be played out in the same general direction as the main line. A second drum 34ª is mounted on the auxiliary shaft 35. A friction wheel 36 is fixed on the shaft 35 and has the friction rings 37 and 38. A friction surface 39 is arranged on the drum 34 and the drum is forced into engagement through the thrust mechanism comprising the thrust collar 40, thrust key 41 and thrust pin 42 in the usual manner and is released by a spring 43.

The drum 34ª has a friction surface 38ª and is forced into engagement by the thrust mechanism comprising the thrust plate 44, thrust pins 45, thrust collar 46, thrust key 47 and thrust pin 48. Springs 48ª are designed to release the drum 34ª.

The shaft 35 is driven by a gear 49 which gear meshes with the indirect drive gear 33.

It will be observed that the drive for the shaft 35 is constant so that with a given speed of the engine there is a constant speed of the drums 34 and 34ª. This, as before stated, is such as to give these drums the greatest practical speed.

What I claim as new is:—

1. In a logging engine, the combination of a drum; a drum shaft on which the drum is mounted; an internal and external gear mounted on the shaft; means for securing the drum to said gear; a drive shaft; two trains of gears leading from the drive shaft to said internal and external gear on the drum shaft, said trains having different gear ratios and being adapted to drive the drum in the same direction; and clutch mechanisms in each train of gears.

2. In a logging engine, the combination of a drum; a drum shaft on which the drum is mounted; an internal and external gear mounted on the shaft; means for securing the drum to said gear; a drive shaft; two trains of gears leading from the drive shaft to said internal and external gear on the drum shaft, said trains having different gear ratios and being adapted to drive the drum in the same direction; clutch mechanism in each train of gears; an auxiliary drum shaft; and a drum on the auxiliary shaft, one of said drums being directly in front of the other.

3. In a logging engine, the combination of a drum; a drum shaft on which the drum is mounted; an internal and external gear mounted on the drum shaft driving said drum; a drive shaft; an intermediate shaft; a direct drive gear on the drive shaft meshing with the external gear; an intermediate driven gear on the intermediate shaft; an indirect drive gear on the drive shaft meshing with said intermediate driven gear; an intermediate driving gear on the intermediate shaft meshing with the internal gear; and clutch mechanisms for throwing in either the direct or indirect train of gears.

4. In a logging engine, the combination of a drum; a drum shaft on which the drum is mounted; an internal and external gear mounted on the drum shaft; a clutch mechanism between said gear and said drum; a drive shaft; an intermediate shaft; a direct drive gear on the drive shaft meshing with the external gear; an intermediate driven gear on the intermediate shaft; an indirect drive gear on the drive shaft meshing with said intermediate driven gear; an intermediate drive gear on the intermediate shaft meshing with the internal gear; and clutch mechanisms for throwing in either the direct or indirect train of gears.

5. In a logging engine, the combination of a drum; a drum shaft on which the drum is mounted; an internal and external gear mounted on the drum shaft driving said drum; a drive shaft; an intermediate shaft; a direct drive gear on the drive shaft meshing with the external gear; an intermediate driven gear on the intermediate shaft; an indirect drive gear on the drive shaft meshing with said intermediate driven gear; an intermediate driving gear on the intermediate shaft meshing with the internal gear; a clutch mechanism on the drive shaft for locking the direct drive gear with the drive shaft; and a clutch mechanism in the indirect train of gearing.

6. In a logging engine, the combination of a drum; a drum shaft on which the drum is mounted; an internal and external gear mounted on the drum shaft driving said drum; a drive shaft; an intermediate shaft; a direct drive gear on the drive shaft meshing with the external gear; an intermediate driven gear on the intermediate shaft; an indirect drive gear on the drive shaft meshing with said intermediate driven gear; an intermediate driving gear on the intermediate shaft meshing with the internal gear; a clutch mechanism on the intermediate shaft for throwing in the indirect train of gearing; and a clutch mechanism in the direct train of gearing.

7. In a logging engine, the combination of a drum; a drum shaft on which the drum is mounted; an internal and external gear mounted on the drum shaft driving said drum; a drive shaft; an intermediate shaft; a direct drive gear on the drive shaft meshing with the external gear; an intermediate driven gear on the intermediate shaft; an indirect drive gear on the drive shaft meshing with said intermediate driven gear; an intermediate driving gear on the intermediate shaft meshing with the internal gear; a clutch mechanism on the intermediate shaft for throwing in the indirect train of gearing; and a clutch mechanism in the direct train of gearing mounted on the drive shaft.

8. In a logging engine, the combination of a drum; a drum shaft on which the drum is mounted; an internal and external gear mounted on the drum shaft driving said drum; a drive shaft; an intermediate shaft; a direct drive gear on the drive shaft meshing with the external gear; an intermediate driven gear on the intermediate shaft; an indirect drive gear on the drive shaft meshing with said intermediate driven gear; an intermediate driving gear on the intermediate shaft meshing with the internal gear; clutch mechanisms for throwing in either the direct or indirect train of gears; an auxiliary drum shaft; and a drum arranged on the auxiliary shaft, one of said drums being directly in front of the other.

9. In a logging engine, the combination of a drum; a drum shaft on which the drum is mounted; an internal and external gear mounted on the drum shaft driving said drum; a drive shaft; an intermediate shaft; a direct drive gear on the drive shaft meshing with the external gear; an intermediate driven gear on the intermediate shaft; an indirect drive gear on the drive shaft meshing with said intermediate driven gear; an intermediate driving gear on the intermediate shaft meshing with the internal gear; clutch mechanisms for throwing in either the direct or indirect train of gears; an auxiliary drum shaft; an auxiliary gear on said shaft meshing with the indirect drive gear; and a drum on said shaft.

In testimony whereof I have hereunto set my hand.

HARRY L. TURNEY.